United States Defensive Publication [19] (H) [11] T967,007

Fagerburg et al. [43] Feb. 7, 1978

[54] COMPOSITIONS OF POLYESTERS HAVING FINE PARTICLES OF POLY (1,4-CYCLOHEXYLENE-DIMETHYLENE TEREPHTHALATE) DISPERSED THEREIN

[76] Inventors: David R. Fagerburg, 3812 Cimarron Drive; Burns Davis, 2019 Bruce St., both of Kingsport, Tenn. 37664; Willis C. Wooten, 521 Lakewood Rd., Kingsport, Tenn. 37660

[21] Appl. No.: 731,877

[22] Filed: Oct. 13, 1976

Related U.S. Application Data

[63] Continuation of Ser. No. 664,842, March 8, 1976, abandoned.

[51] Int. Cl.[2] ..... C08L 67/02

[52] U.S. Cl. ..... 260/860

[57] ABSTRACT

Disclosed are compositions comprised of fine particles of unannealed poly(1,4-cyclohexylenedimethylene terephthalate) dispersed in a poly(tetramethylene terephthalate) type polyester, a poly(pentamethyleneterephthalate) type polyester, a poly(hexamethylene terephthalate) type polyester, a poly(1,4-cyclohexylenedimethylene terephthalate/isophthalate) type polyester, a poly(tetramethylene terephthalate) type polyester modified with poly(alkylene oxide)-glycol, a poly(1,4-cyclohexylenedimethylene terephthalate) type polyester modified with poly(alkylene oxide) glycol or a polyester prepared from 1,4-cyclohexanedicarboxylic acid, dimer acid, and 1,4-cyclohexanedimethanol.

9 Claims, No Sheets Drawing,

22 Pages Specification

The file of this unexamined application may be inspected and copies thereof may be purchased (849 O.G. 1221, Apr. 9, 1968).